United States Patent
Mao et al.

(10) Patent No.: US 8,374,114 B2
(45) Date of Patent: Feb. 12, 2013

(54) METHOD AND SYSTEM FOR ORGANIZING BROADCAST CONTENT

(75) Inventors: Zhiheng Mao, San Diego, CA (US); Jason A. Reich, San Diego, CA (US); Ethan M. Idenmill, San Diego, CA (US); Devarshi P. Shah, San Diego, CA (US); Scott T. Swazey, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 282 days.

(21) Appl. No.: 12/828,661

(22) Filed: Jul. 1, 2010

(65) Prior Publication Data

US 2011/0188435 A1    Aug. 4, 2011

Related U.S. Application Data

(60) Provisional application No. 61/299,557, filed on Jan. 29, 2010.

(51) Int. Cl.
*H04H 20/71* (2008.01)
(52) U.S. Cl. ........................................ 370/312
(58) Field of Classification Search .................. 370/312, 370/466
See application file for complete search history.

(56) References Cited

U.S. PATENT DOCUMENTS

| | | |
|---|---|---|
| 2007/0088971 A1 | 4/2007 | Walker et al. |
| 2008/0170564 A1 | 7/2008 | Shi et al. |
| 2008/0216116 A1 | 9/2008 | Pekonen et al. |

OTHER PUBLICATIONS

International Search Report and Written Opinion—PCT/US2011/023035—ISA/EPO—May 23, 2011.
Qualcomm: "MediaFLO Technology overview", Internet Citation, Feb. 2, 2009, pp. 1-23, XP002617156, Retrieved from the Internet : URL: http://www.qualcomm. com/documents/files/mediaflo-technology-overview.pdf [retrieved on Jan. 13, 2011].

*Primary Examiner* — Ricky Ngo
*Assistant Examiner* — Ben H Liu
(74) *Attorney, Agent, or Firm* — Ryan N. Farr

(57) ABSTRACT

Embodiment methods and systems enable a broadcast network, such as a MediaFLO network, to maintain the presentation quality of video data received from content providers when transforming it to a format suitable for broadcasting to mobile devices. Methods enable encoding of H.264 frames received from a third-party encoder into superframes for broadcast over MediaFLO FLO TV®. The methods group individual image frames together into superframes for broadcast, making allowances for frames which are supposed to be decoded in one second but presented or displayed in a subsequent second. The various embodiments ensure that image frames are group together into superframe so that frames that are supposed to be presented together in the same second are displayed together and so that frames that are dependent on those frames for decoding are not put ahead of the frames from which they depend.

8 Claims, 6 Drawing Sheets

METHOD AND SYSTEM FOR ORGANIZING BROADCAST CONTENT

The present Application for Patent claims priority to Provisional Application No. 61/299,557, entitled "METHOD AND SYSTEM FOR ORGANIZING BROADCAST CONTENT", filed Jan. 29, 2010, assigned to the assignee hereof and hereby expressly incorporated by reference herein in its entirety.

BACKGROUND

Wireless communication technologies have seen explosive growth over the past few years. This growth has been fueled by wireless services providing freedom of movement to the mobile public, and cutting the tether to hardwired communication systems. As a result of service enhancements, the popularity of wireless services is expected to continue to grow rapidly. A recent addition to wireless communication services has been the ability to broadcast television and other content to mobile devices. Mobile multimedia broadcast services allow users to view TV programming, as well as receive mobile editions of news, entertainment, sports, business, and other programming, using their cell phone or other wireless mobile device configured to receive the mobile broadcast transmissions.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
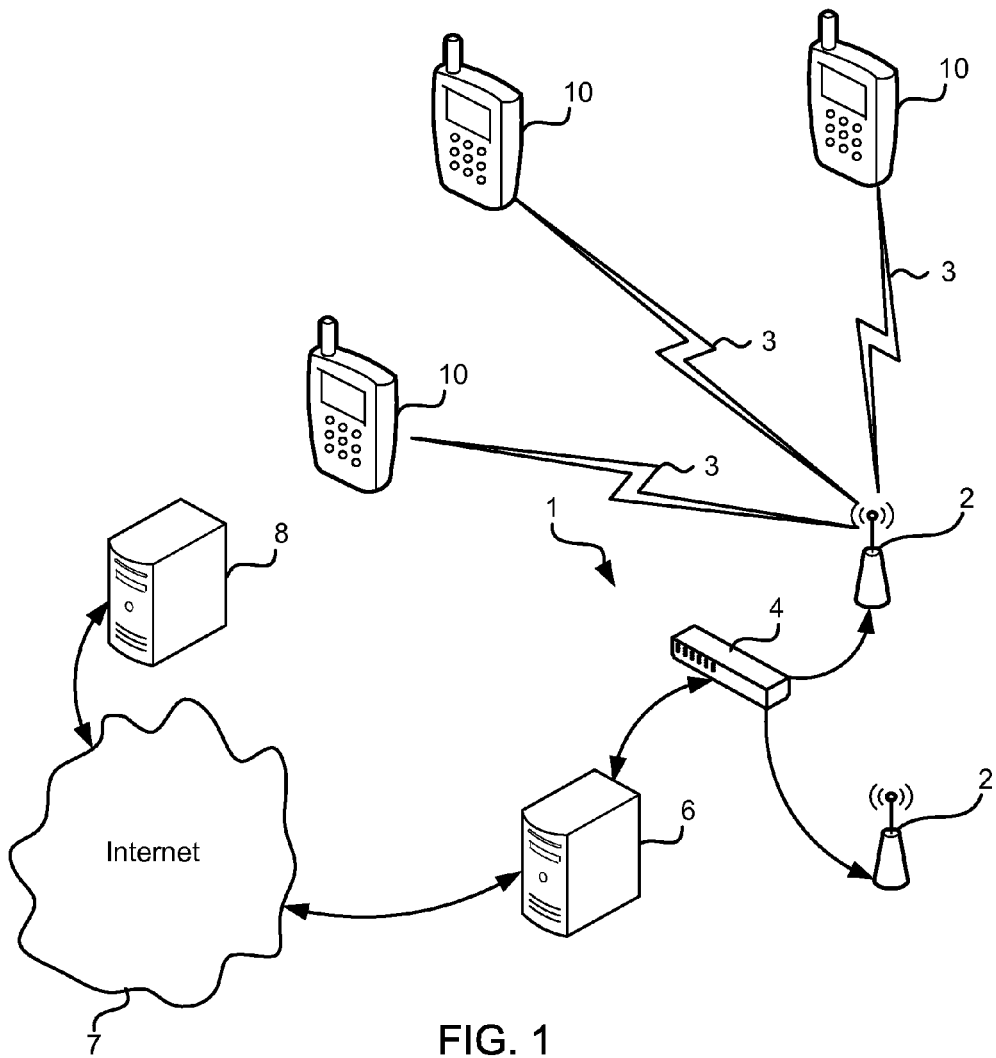
FIG. 1 is a communication system block diagram illustrating a mobile multimedia broadcast communication system suitable for use in an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The word "broadcast" is used herein to mean the transmission of data (information packets) so that it can be received by a large number of receiving devices simultaneously. Examples of a broadcast message are mobile television service broadcast signals, including content broadcasts (content flow) and metadata broadcasts (information flow) such as the Electronic Program Guide (EPG).

A number of different mobile broadcast television services and broadcast standards are available or contemplated in the future, all of which may implement and benefit from the various embodiments. Such services and standards include, e.g., Open Mobile Alliance Mobile Broadcast Services Enabler Suite (OMA BCAST), MediaFLO, Digital Video Broadcast IP Datacasting (DVB-IPDC), Digital Video Broadcasting-Handheld (DVB-H), Digital Video Broadcasting-Satellite services to Handhelds (DVB-SH), Digital Video Broadcasting-Handheld 2 (DVB-H2), Advanced Television Systems Committee-Mobile/Handheld (ATSC-M/H), and China Multimedia Mobile Broadcasting (CMMB).

A typical mobile multimedia broadcast network transmits content on a plurality of different channels or flows, thereby enabling several different programs to be broadcast simultaneously. Due to the nature of the broadcast transmission waveform, the plurality of different channels or flows may be carried over the same radio frequency spectrum, such as in an orthogonal frequency domain multiplex (OFDM) wave form, including a structure and information that enables each of the channels or flows to be selected and received by receiver devices. Individual channels or flows may be identified by an address or a flow identifier (ID). Information within the content description flow enables receiver devices to determine the particular address or flow ID to access in order to receive a particular content. Each content flow is carried on one or more media logical channels (MLC) of the physical layer with the data provided to upper protocol layers which process the data to access a selected content flow and the information flows.

In the multimedia broadcast system, content providers typically encode and transmit content data to broadcast network providers in different formats. Broadcast network providers receive the content data and use specific broadcast standards to send data to mobile devices. However, the encoding standards used by the content providers may not be the same as the standard required for broadcasting data to mobile devices. Thus, the broadcast network providers may be required to convert the format of the data received from the content providers to one that is used to broadcast data to mobile devices.

For example, a content provider may encode content data using the MPEG-2 standard (generic coding of moving pictures and associated audio information). Accordingly, a broadcast network provider may be required to convert the MPEG-2 encoded content data to data that may be broadcasted using superframes. Video streams that undergo the conversion from MPEG-2 to superframe compatible format may have poor quality when displayed by mobile devices.

The various embodiment methods and systems enable a broadcast network, such as a MediaFLO network, to maintain the presentation quality of video data received from content providers when transforming it into a format that is suitable for broadcasting to mobile devices. In particular, the various embodiments enable encoding of H.264 frames from a third-party encoder, such as a content provider, into superframes for broadcast over a multimedia broadcast system, such as MediaFLO FLO TV®. The embodiments provide methods and systems for grouping individual image frames together into broadcast superframes, making allowances for frames which are supposed to be decoded in one second but presented or displayed in a subsequent second. The various embodiments can be implemented to ensure that image frames are grouped together into superframe so that frames that are supposed to be presented together in the same second are displayed together and so that frames that are dependent on those frames for decoding are not put ahead of the frames from which they depend.

Example components of a typical mobile multimedia broadcast system are illustrated in FIG. 1. A mobile multimedia broadcast network 1 typically includes a plurality of broadcast transmitters 2 controlled by a mobile broadcast network control center 4. The mobile multimedia broadcast network 1 broadcasts content from the broadcast transmitters 2 as mobile broadcast transmissions 3 for reception by mobile devices 10, such as smartphones, cellular phones, personal digital assistants (PDA), interactive game devices, notebooks, smartbooks, netbooks, mobile television devices, data processing apparatus, or other such electronic devices. Within the mobile broadcast network control center 4 will typically be one or more servers 6 which may be configured to manage the scheduling of content broadcasts, generation of electronic service guides and other metadata regarding the content broadcasts, and generation of metadata messages for broadcast via the information flow of the mobile multimedia broadcast network 1. One or more servers 6 may also include connections to an external network, such as the Internet 7, through which the server 6 may receive content feeds from content provider servers 8. One or more servers 6 may determine a schedule for broadcast of the content in content batches, generate an information flow including metadata regarding the content (e.g., broadcast times and flow numbers), assign a version number to the information flow, and provide the information flow data to the mobile multimedia broadcast network 1 for inclusion within the broadcast signal that is transmitted for reception by mobile receiver devices 10.

Figure 2:
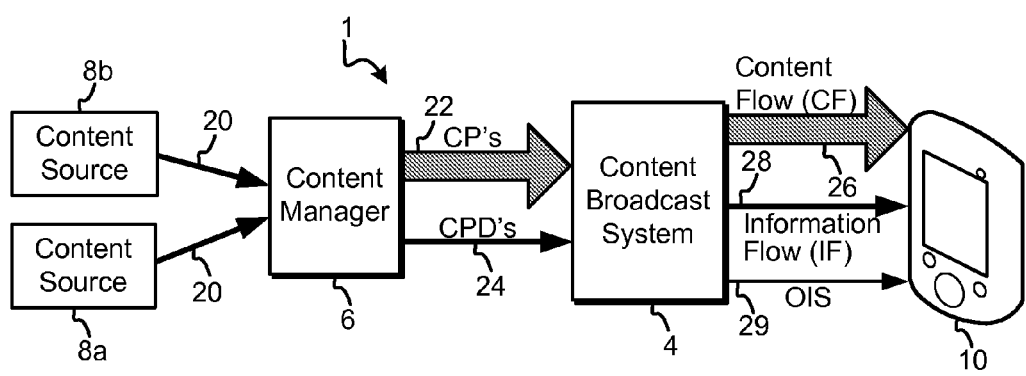
FIG. 2 is an alternative representation of a communication system block diagram of a mobile multimedia broadcast system.

FIG. 2 illustrates the generation and transmission of signals within a mobile multimedia broadcast network 1. As mentioned above, a mobile multimedia broadcast network 1 may receive content (e.g., television programs websites, serial data feeds, etc.) from a number of content sources 8a, 8b. Such content may be provided to a content manager server 6 within a mobile multimedia broadcast network 1 via data networks 20 (e.g., the Internet 7). The content manager server 6 may store such content in a database and scheduled the content for broadcast. In scheduling content for broadcast, the content manager server 6 determines what will be broadcast when and on which broadcast stream (e.g., flow or channel number). As part of scheduling, the content manager server 6 may format the content into content packages (CPs). The content manager server 6 can also determine information about the content, such as a title of the information, its source (e.g., an Internet address, URL or producer), the nature of the information (e.g., sports, news, finance, etc.), its age or date/time of creation, and other information about the content that may be useful for selecting content matching user preferences.

The content manager server 6 may combine the scheduled broadcast time and address with the other information regarding the content (such as the associated media logical channels for each content flow) to generate content packet descriptions (CPDs) which will be broadcast in one or more information flows. When content is scheduled for broadcast, the content manager server 6 may provide the content packages to the content broadcast system 4 in an internal network dataflow 22, along with the content package descriptions in an internal network dataflow 24. These data flows can be processed by the content broadcast system 4 into a multiplex broadcast waveform which can be broadcast live by, e.g., the network transmitters 2 depicted in FIG. 1, as broadcast transmissions.

Video streams of H.264 frames come in the form of a transport stream that includes timestamps which indicate an amount of time. Each image frame has a unique timestamp. The timestamp may vary of among the different formats, for example, MPEG-2 formats can have 90 kHz timestamps. In some implementations, in order to fit a video stream within the superframes of a MediaFLO broadcast system, the media frames need to be allocated into a series of superframes which are each one seconds long.

Figure 3:
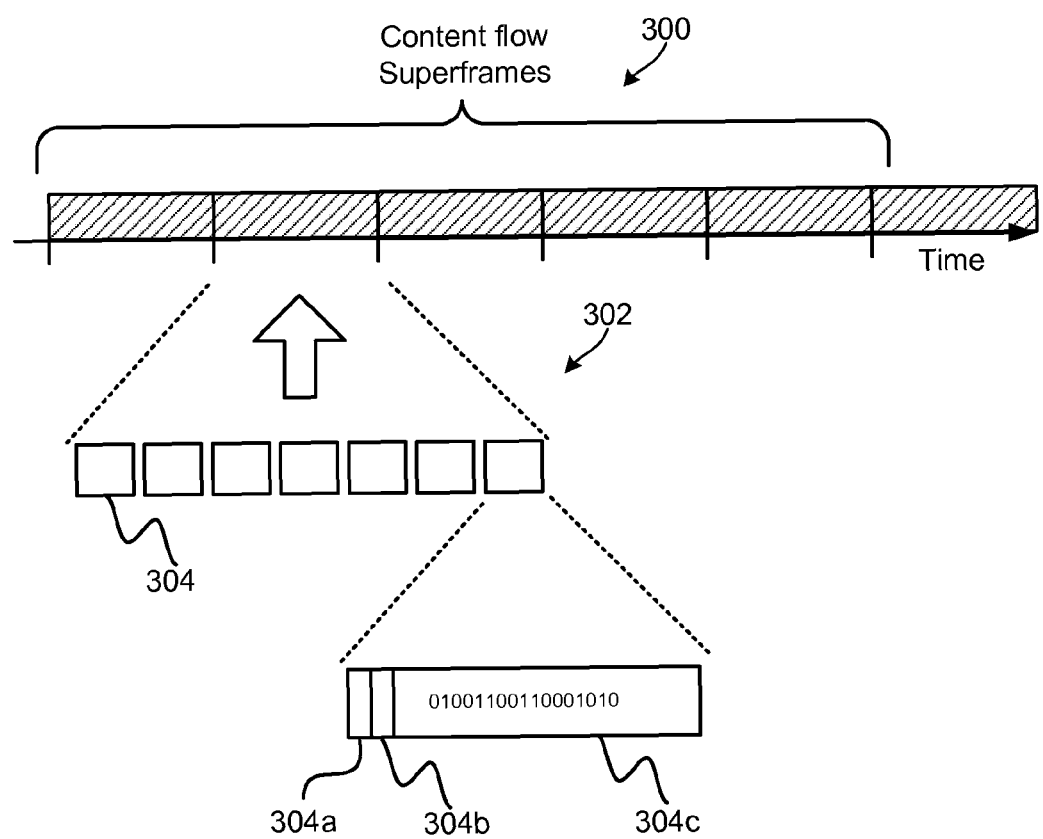
FIG. 3 is diagram of a broadcast datastream transmitted in OFDM format illustrating the transmission of data frames in superframes according to an embodiment.

FIG. 3 illustrates a group of superframes 300 typical of a MediaFLO system which includes a series of image frames 304 within a particular media logical channel 302 which can fit content data within an OFDM multiplexed broadcast signal. In a typical mobile broadcast system, the various content flows, information flows and overhead information (e.g., OIS flow) are transmitted in a series of superframes 300 that are broadcasted to mobile devices. For example, data frames 304 may be carried by a superframe 302. In some implementations, each data frame 304 may include a presentation timestamp (PTS) 304a, decode timestamp (DTS) 304b, and the data content 304c comprising the image frame.

For example, MPEG-2 transport stream frames can have a PTS 304a which is in units of 90 kHz. Some frames also have a DTS 304b, which is also in 90 kHz. In some implementations, if a frame only has a PTS 304a, it must be decoded and presented (i.e., displayed) at the same time. In some other implementations, if the frame has a DTS 304b as well, it must be decoded at one time, and then presented at another time. The presence of separate DTSs 304b in some frames add a level of complexity to the process of determining the order of the frames during broadcast to mobile devices 10. This is because it is possible for some frames to straddle superframe boundaries (i.e., if not for the various embodiments the frames might be decoded in one superframe and presented in the next).

If frames are allowed to straddle superframe boundaries, the quality of the data received by the mobile device 10 may be reduced. For example, if an MPEG-2 frame that must be decoded in one superframe is transmitted in a superframe that arrives at a later time, the quality of data received may be reduced because the mobile device 10 may fail to timely decode the correct frames.

Figure 4:
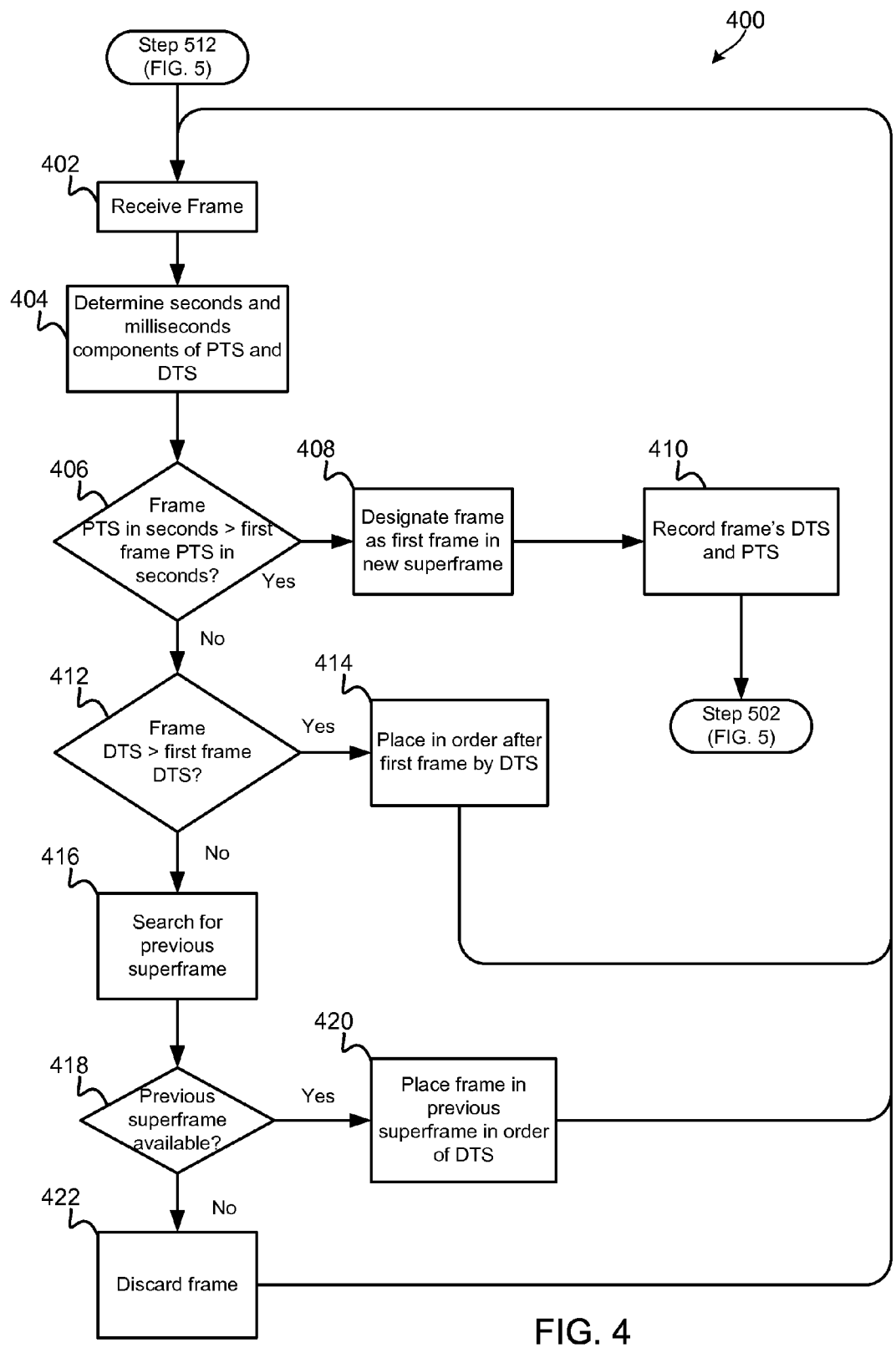
FIG. 4 is a process flow diagram for an embodiment method for organizing data frames.
Figure 5:
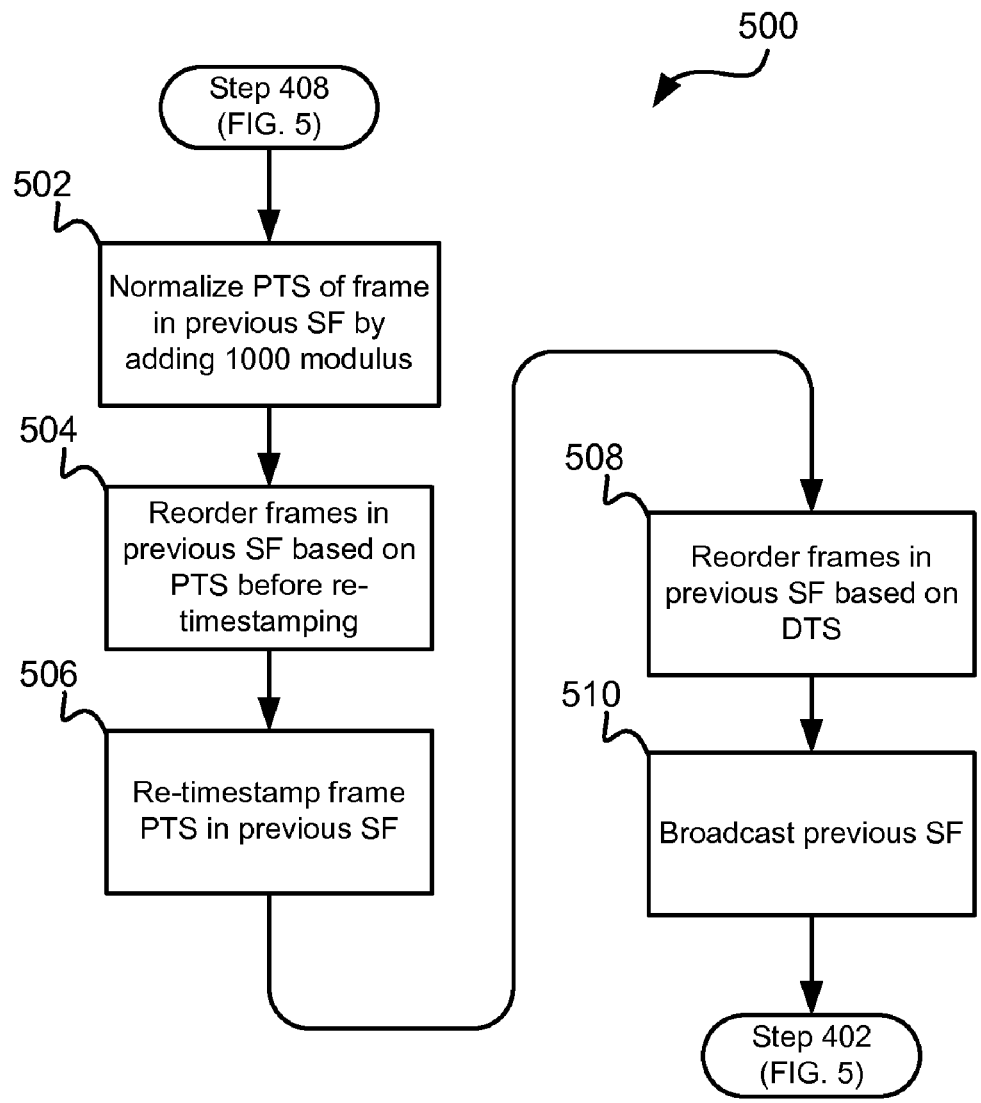
FIG. 5 is a process flow diagram for an embodiment method for organizing data frames.

FIGS. 4 and 5 illustrate process flow diagrams 400 and 500 for, e.g., an embodiment method for organizing data frames 304 received from a content provider to maintain high quality of data broadcasted to mobile devices. The content manager server 6 depicted in FIG. 1 may be configured to receive content data from the content provider. The content manager server 6 may receive a frame 304 from a content provider, step 402, and determine the seconds and milliseconds components of the data frame's 304 PTS 304a and DTS 304b, determination step 404. The content manager server 6 may determine whether the received frame is the first frame in a current superframe 300. To do this, the content manager server 6 may determine whether the seconds component of a received frame PTS 304a is greater than the seconds component of a first frame PTS 304a, determination 406. If the seconds component of the frame PTS 304a is greater than the second component of a first frame PTS 304a (i.e., determination step 406="Yes"), the content manager server 6 may designate the frame with a greater seconds component as the first frame in a new superframe, step 408, and record the frame's DTS and PTS. For example, if the seconds component of the PTS 304a of a first received frame 304 is one second and the seconds component of another PTS 304a in a fifth received frame is two seconds, the first frame may be placed in a previous superframe 302 and the fifth frame may become the first frame of a new superframe 303.

If the seconds component of the frame PTS 304a is less than the second component of a first frame PTS 304a (i.e., determination step 406="No"), the content manager server 6 may be configured to determine whether the DTS 304b of the received frame is greater than the DTS 304b of the first in determination step 412. If the DTS 304b of the received frame is greater than the DTS 304b of the first received frame (i.e., determination step 412="Yes"), the content manager server 6 may place the received frame in order of DTS 304b after the first received frame in step 414. The content manager server 6 may receive a new frame by returning to step 402.

If the DTS 304b of the received frame is less than the DTS 304b of the first received frame (i.e., determination step 412="No"), the content manager server 6 may search for the previous superframe, step 416, and determine whether the previous superframe is available in determination step 418. If the previous superframe 302 is available (i.e., determination step 418="Yes"), the content manager server 6 may place the received frame with a smaller DTS 304b in the previous superframe 302 and in order of the DTS 304b in step 420, before returning to step 402 to receive the next frame. If the previous superframe 302 is not available (i.e., determination 418="No"), the content manager server 6 may discard the frame with the smaller DTS 304b, step 422, before returning to step 402 to receive the next frame.

Once a frame is designated as the first frame of a new superframe, step 408, and the frame's DTS 304b and PTS 304a are recorded, step 410, the content manager server 6 may organize the frames 304 in the previous superframe 302 to prepare it for broadcast to mobile devices 10. In doing so the content manager server 6 may perform a normalization process 500 as illustrated in FIG. 5.

Referring to FIG. 5, the content manager server 6 may normalize the PTS 304a of the previous superframe (SF) by adding 1000 modulus to the millisecond component of the PTS 304a if the seconds component of the frame's PTS is the same as the current superframe, step 502. In some implementations, this addition of 1000 to the millisecond component is only performed if the second component of the frame's PTS is the same as the current superframe (i.e., frames whose second component of their PTS's are one second behind the current superframe will not have 1000 milliseconds added) so that those frames that should be presented at the beginning of the superframe don't accidentally end up at the end. In step 504, the content manager server may reorder the frames in previous superframe 302 based on PTS 304a, step 504. The content manager server 6 may re-timestamp the PTS 304a of the frames 304 in the previous superframe 302, step 506, and reorder the frames based on the DTS 304b in preparation for broadcasting, step 508. The content manager server 6 may broadcast the previous superframe in step 510, and receive another frame by returning to step to step 402.

For example, a series of frames may be received by a content manager server 6 of a broadcast network provider and normalized as follows. The numbers used in this example are selected arbitrarily and do not represent actual timestamp values:

| frame 1 | frame 2 | frame 3 |
|---|---|---|
| PTS - 001:000 | PTS - 000:900 | PTS - 001:100 |
| DTS - 000:800 | DTS - 000:900 | DTS - 001:100 |

The content manager server 6 may be configured to add 1000 modulus to a PTS 304a to normalize the PTS time values in a superframe 302 before broadcasting it to the mobile devices 10. This may yield the following frames:

| frame 1 | frame 2 | frame 3 |
|---|---|---|
| PTS - 001:1000 | PTS - 000:900 | PTS - 001:1100 |
| DTS - 000:800 | DTS - 000:900 | DTS - 001:100 |

Using the new PTS 304a values, the content manager server 6 may temporarily reorder the frames according to their new PTS 304a values and re-timestamp them so that all of the PTS 304a values are under 1000:

Reordered before re-timestamping the frames look as follows:

| frame 2 | frame 1 | frame 3 |
|---|---|---|
| PTS - 000:900 | PTS - 001:1000 | PTS - 001:1100 |
| DTS - 000:900 | DTS - 000:800 | DTS - 001:100 |

Reordered after re-timestamping the frames look as follows:

| frame 2 | frame 1 | frame 3 |
|---|---|---|
| PTS - 000:000 | PTS - 001:100 | PTS - 001:200 |
| DTS - 000:900 | DTS - 000:800 | DTS - 001:100 |

Reordered in decode order for broadcasting (since mobile devices 10 only recognize PTS millisecond component), the frames look as follows:

| frame 1 | frame 2 | frame 3 |
|---|---|---|
| PTS - 001:100 | PTS - 000:000 | PTS - 001:200 |
| DTS - 000:800 | DTS - 000:900 | DTS - 001:100 |

Thus, in some implementations, the final renumbering of PTS 304a millisecond component to reduce the numbers to fewer than 1000 is only performed once all frames have been collected for a superframe. The actual increment for each frame may be (frame number−1)*1000/(number of frames in the superframe). For example, if 24 frames were in a superframe 302, then the millisecond component of the PTS for frame 1 would be 0 (or more accurately, 0*1000/24), for frame 2 would be 1*1000/24, and for frame 3 would be 23*1000/24.

Figure 6A:
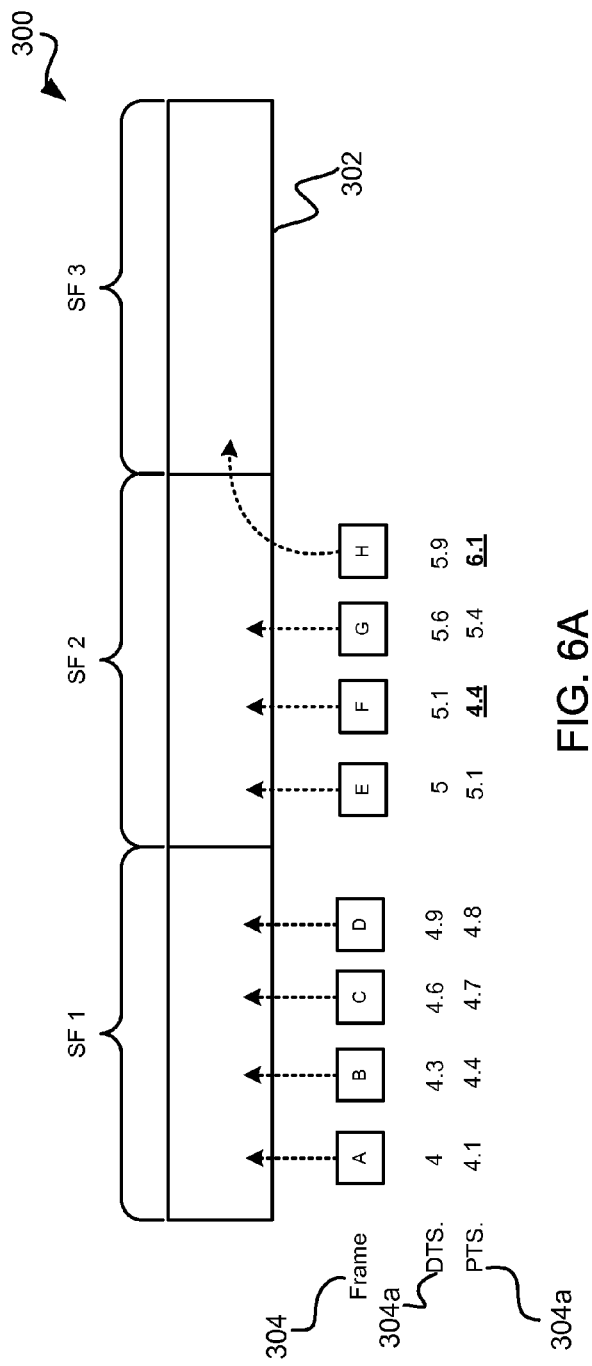
FIGS. 6A-6B are diagrams of superframes illustrating an organization of frames in superframes according to their presentation or decode timestamps according to an embodiment.
Figure 6B:
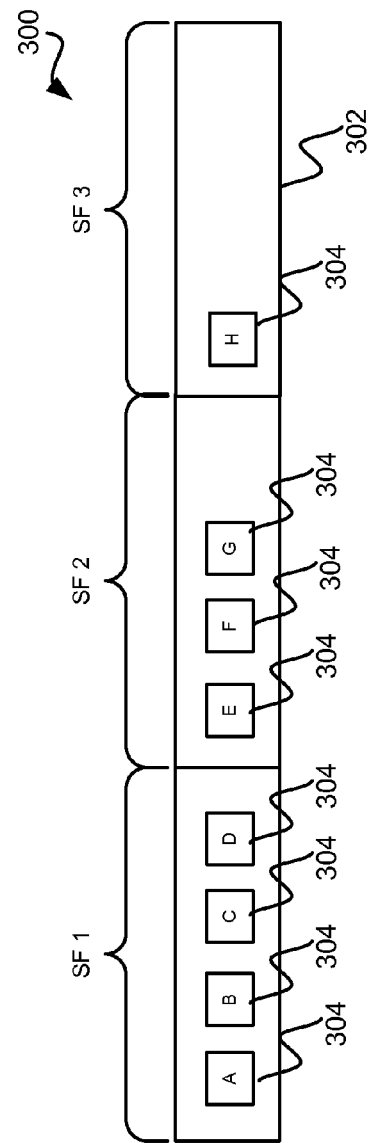

To further illustrate the embodiments, FIGS. 6A and 6B show a group of frames 304 that may be grouped into different superframes 300 for broadcasting to mobile devices 10 according to an embodiment. Transport stream of frames may be received by the content manager server 6 of a broadcast network provider. The transport stream of frames may be in the order of DTS 304*b*. The content manager server 6 may determine the seconds and milliseconds components of each frame to determine the order in which they may be grouped in superframes 302. For example, frame A may be the first frame received. The content manage server 6 may record the PTS 304*a* and DTS 304*b* of frame A. Frame A has a PTS seconds component of 4 seconds and may be placed in superframe 1 (SF 1). The content manager server 6 may receive frame B and determine its seconds and milliseconds components of the PTS 304*a* and DTS 304*b*. For example, frame B may have a PTS 304*a* of 4.4 and DTS 304*b* of 4.3. The content manager server 6 may determine whether the seconds component of PTS 304*b* of frame B is greater than the second component of PTS 304*a* of frame A. Because the second components of both PTS 304*a* of frame A and frame B are equal (i.e., 4 seconds), the content manager server 6 may place frame B in SF 1 in the order of DTS 304*b*. Thus, frame B will be placed after frame A because the DTS 304*b* of frame B is larger than the DTS 304*b* of frame A.

In some implementations, the content manager server 6 may continue to populate SF 1 until a frame is received which includes a second component of PTS 304*a* which is larger than the second component of frame A. At that point, the content manager server 6 may start populating the next superframe SF 2. For example, the content manager server 6 may receive frame E and determine the seconds and milliseconds components of the PTS 304*a* and DTS 304*b* of frame E. The content manager server 6 may compare the seconds component of the PTS 304*a* of frame E with that of frame A. Because the seconds component of the PTS 304*a* of frame E is five seconds and is greater than the seconds component of the PTS 304*a* of frame A which is four seconds, the content manager server 6 may begin populating a new superframe SF 2. Thus, frame E may be placed into SF 2 as the first frame. The content manager server 6 may then record the PTS 304*a* and DTS 304*b* of frame E. The content manager server 6 may compare the time component of frames received after frame E to the recorded time component of frame E for populating the superframe.

The content manager server 6 may then receive frame F which has a PTS 304*a* of 4.4. Since a new superframe (i.e., SF 2) has begun, frame F may be placed into SF 2, even though the PTS 304*a* of frame F is 4.4. Frame F may be placed in SF 2 in order of its DTS 304*b*. Frame H may be placed in the next superframe (SF 3) since the seconds component of PTS 304*a* of frame H is larger than the seconds component of PTS 304*a* of frame E. As a result, SF 1 may include frames A, B, C, and D. SF 2 may include frames E, F and G. SF 3 may include frame H.

Once populating of a new superframe begins, the content manager server 6 may normalize the previous superframe to prepare it for broadcast to mobile devices 10. For example, once frame E is received and the content manager server 6 begins populating SF 2, the content manager server 6 may begin the normalization process of SF 1. The normalization process is explained above with reference to FIG. 5.

Figure 7:
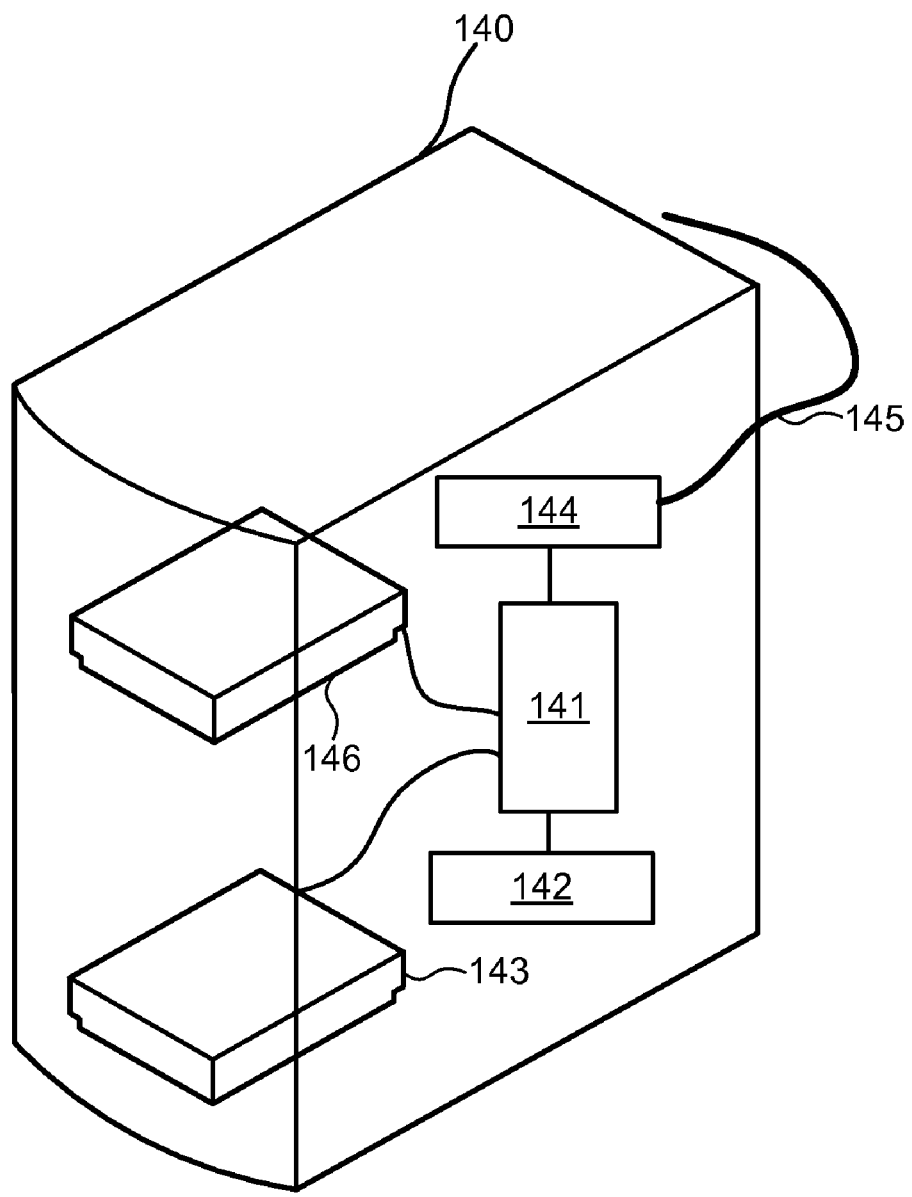
FIG. 7 is a component block diagram of a server device suitable for use in an embodiment.

A number of the embodiments described above may also be implemented with any of a variety of commercially available server devices, such as the server 140 illustrated in FIG. 7. Such a server 140 typically includes a processor 141 coupled to volatile memory 142 and a large capacity nonvolatile memory, such as a disk drive 143. The server 140 may also include a floppy disc drive and/or a compact disc (CD) drive 146 coupled to the processor 141. The server 140 may also include network access ports 144 coupled to the processor 141 for establishing data connections with a network 145, such as the Internet.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a tangible or non-transitory computer-readable storage medium. Computer-readable storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above also can be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for organizing video frames within superframes of a broadcast signal, comprising:
receiving a frame, each frame including a presentation timestamp and decode timestamp;
determining seconds and milliseconds components of the presentation timestamps and decode timestamps of the received frame;
comparing the seconds component of the presentation timestamps of the received frame to a first frame in a first superframe;
determining whether the seconds component of the presentation timestamp of the received frame is greater than the second component of the presentation timestamp of the first frame;
determining whether the decode timestamps of the received frame is greater than the decode timestamps of the first frame if the seconds component of the presentation timestamp of the received frame is not greater than the second component of the presentation timestamp of the first frame;
searching for a previous superframe if the decode timestamps of the received frame is not greater than the decode timestamps of the first frame;
determining whether the previous superframe is available;
discarding the received frame if the previous superframe is not available;
placing the received frame in the previous superframe if previous superframe is available; and
placing the received frame in order of decode timestamps in the first superframe after the first frame if the decode timestamps of the received frame is greater than the decode timestamps of the first frame.

2. The method of claim 1, further comprising:
designating the received frame as a first frame in a second superframe if the seconds component of the presentation timestamp of the received frame is not greater than the second component of the presentation timestamp of the first frame;
recording the received frame's presentation timestamp and decode timestamps when the received frame is designated as a first frame in the second superframe;
normalizing the presentation timestamp of frames in a previous superframe by adding 1000 modulus;
reordering the frames in the previous superframe based on the presentation timestamp before re-timestamping;
re-timestamping the presentation timestamp of the frames of the previous superframe;
reordering the frames of the previous superframe based on their decode timestamp; and
broadcasting the previous superframe to mobile devices.

3. A server, comprising:
a processor; a network access circuit coupled to the processor is configured to receive content frames from a content provider; and
a memory coupled to the processor, wherein the processor is configured with processor-executable instructions to perform operations comprising:
receiving a frame, each frame including a presentation timestamp and decode timestamp;
determining seconds and milliseconds components of the presentation timestamps and decode timestamps of the received frame;
comparing the seconds component of the presentation timestamps of the received frame to a first frame in a first superframe;
determining whether the seconds component of the presentation timestamp of the received frame is greater than the second component of the presentation timestamp of the first frame;
determining whether the decode timestamps of the received frame is greater than the decode timestamps of the first frame if the seconds component of the presentation timestamp of the received frame is not greater than the second component of the presentation timestamp of the first frame;
searching for a previous superframe if the decode timestamps of the received frame is not greater than the decode timestamps of the first frame;
determining whether the previous superframe is available;
discarding the received frame if the previous superframe is not available;
placing the received frame in the previous superframe if previous superframe is available; and
placing the received frame in order of decode timestamps in the first superframe after the first frame if the decode timestamps of the received frame is greater than the decode timestamps of the first frame.

4. The server of claim 3, wherein the processor is configured with processor executable instructions to perform operations, further comprising:
designating the received frame as a first frame in a second superframe if the seconds component of the presentation timestamp of the received frame is not greater than the second component of the presentation timestamp of the first frame;
recording the received frame's presentation timestamp and decode timestamps when the received frame is designated as a first frame in the second superframe;
normalizing the presentation timestamp of frames in a previous superframe by adding 1000 modulus;
reordering the frames in the previous superframe based on the presentation timestamp before re-timestamping;
re-timestamping the presentation timestamp of the frames of the previous superframe;
reordering the frames of the previous superframe based on their decode timestamp; and
broadcasting the previous superframe to mobile devices.

5. A server within a broadcast system, comprising:
means for receiving a frame, each frame including a presentation timestamp and decode timestamp;
means for determining seconds and milliseconds components of the presentation timestamps and decode timestamps of the received frame;

means for comparing the seconds component of the presentation timestamps of the received frame to a first frame in a first superframe;
means for determining whether the seconds component of the presentation timestamp of the received frame is greater than the second component of the presentation timestamp of the first frame;
means for determining whether the decode timestamps of the received frame is greater than the decode timestamps of the first frame if the seconds component of the presentation timestamp of the received frame is not greater than the second component of the presentation timestamp of the first frame;
means for searching for a previous superframe if the decode timestamps of the received frame is not greater than the decode timestamps of the first frame;
means for determining whether the previous superframe is available;
means for discarding the received frame if the previous superframe is not available;
means for placing the received frame in the previous superframe if previous superframe is available; and
means for placing the received frame in order of decode timestamps in the first superframe after the first frame if the decode timestamps of the received frame is greater than the decode timestamps of the first frame.

6. The server of claim 5, further comprising:
means for designating the received frame as a first frame in a second superframe if the seconds component of the presentation timestamp of the received frame is not greater than the second component of the presentation timestamp of the first frame;
means for recording the received frame's presentation timestamp and decode timestamps when the received frame is designated as a first frame in the second superframe;
means for normalizing the presentation timestamp of frames in a previous superframe by adding 1000 modulus;
means for reordering the frames in the previous superframe based on the presentation timestamp before re-timestamping;
means for re-timestamping the presentation timestamp of the frames of the previous superframe;
means for reordering the frames of the previous superframe based on their decode timestamp; and
means for broadcasting the previous superframe to mobile devices.

7. A non-transitory computer-readable storage medium having stored thereon computer-executable instructions configured to cause a computer to perform steps, comprising:
receiving a frame, each frame including a presentation timestamp and decode timestamp;
determining seconds and milliseconds components of the presentation timestamps and decode timestamps of the received frame; comparing the seconds component of the presentation timestamps of the received frame to a first frame in a first superframe;
determining whether the seconds component of the presentation timestamp of the received frame is greater than the second component of the presentation timestamp of the first frame;
determining whether the decode timestamps of the received frame is greater than the decode timestamps of the first frame if the seconds component of the presentation timestamp of the received frame is not greater than the second component of the presentation timestamp of the first frame;
searching for a previous superframe if the decode timestamps of the received frame is not greater than the decode timestamps of the first frame;
determining whether the previous superframe is available;
discarding the received frame if the previous superframe is not available;
placing the received frame in the previous superframe if previous superframe is available; and
placing the received frame in order of decode timestamps in the first superframe after the first frame if the decode timestamps of the received frame is greater than the decode timestamps of the first frame.

8. The non-transitory computer-readable medium of claim 7, wherein the stored computer executable instructions are configured to cause a computer to perform steps, further comprising:
designating the received frame as a first frame in a second superframe if the seconds component of the presentation timestamp of the received frame is not greater than the second component of the presentation timestamp of the first frame;
recording the received frame's presentation timestamp and decode timestamps when the received frame is designated as a first frame in the second superframe;
normalizing the presentation timestamp of frames in a previous superframe by adding 1000 modulus; reordering the frames in the previous superframe based on the presentation timestamp before re-timestamping;
re-timestamping the presentation timestamp of the frames of the previous superframe;
reordering the frames of the previous superframe based on their decode timestamp; and
broadcasting the previous superframe to mobile devices.

* * * * *